Patented June 7, 1949

2,472,755

UNITED STATES PATENT OFFICE 2,472,755

DI-(2-CHLORO-CYCLOHEXYL)-SULFIDE AS INSECTICIDE

Harold W. Moll, Midland, Mich., assignor to The Dow Chemical Company, Midland, Mich., a corporation of Delaware No Drawing. Application July 22, 1944,
Serial No. 546,203

4 Claims. (Cl. 167—30)

1

This invention relates to insecticidal materials and is particularly directed to compositions comprising di-(2-chloro-cyclohexyl)-sulfide as an active toxic ingredient and to the novel sulfide compound so employed.

I have discovered that improved agricultural and household insecticide compositions are obtained when a suitable carrier is compounded with di-(2-chloro-cyclohexyl)-sulfide. This compound is in itself novel and has the formula

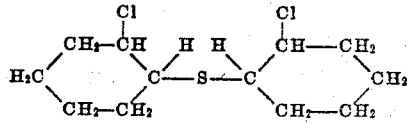

Di-((2-chloro-cyclohexyl)-sulfide is a white crystalline compound melting at 72°-73.5° C., odorless, relatively stable to heat and light, substantially insoluble in water, and somewhat soluble in most organic solvents. These properties render the compound desirable from the point of view of compounding with carriers. Also, deposits of the compound on insect infested surfaces are persistent and not inclined to be leached away by water so that the toxic effect is extended over an appreciable period. The compound has a low oral toxicity rating, the hundred percent lethal dose on guinea pigs being 4.0 grams per kilogram of body weight and the 100 per cent survival dose being 0.6 gram per kilogram.

Di-(2-chloro-cyclohexyl)-sulfide may be employed as a simple solution in organic solvent or as a constituent of either dust or spray compositions. Thus, the compound may be dispersed in various finely-divided inert diluents such as diatomaceous earth, bentonite, talc, gypsum, sulfur, wood flours, inorganic phosphates, clays, and the like, to form dusts adapted to be applied to plants or other insect infested objects and surfaces with standard dusting equipment. If desired, such dusts may be employed as concentrates and subsequently diluted with additional finely-divided carrier or suspennded in water or other liquid diluent to form sprays. The new toxicant may also be compounded with conventional wetting, dispersing, and sticking agents and the resulting concentrates employed to produce spray or dust compositions in which the di-(2-chloro-cyclohexyl)-sulfide is present in any desired concentration.

In the preparation of concentrates, from about 5 to about 80 per cent by weight of the di-(2-chloro-cyclohexyl)-sulfide is conveniently employed. The concentration of the toxicant in the ultimate spray or dust composition is generally between about 0.1 and 10.0 per cent by weight. The composition type in which the new toxicant is employed and the concentration thereof in the ultimate mixture are largely dependent upon the particular insect to be controlled and the circumstances under which such control is to be accomplished.

In other embodiments of the invention, the new toxicant may be employed in combination with oil emulsions for use in ovicidal or dormant applications. The di-(2-chloro-cyclohexyl)-sulfide may also be employed in water suspension with or without an addditional emulsifying, wetting or dispersing agent. Similarly, the compound may be employed in other standard type insecticidal compositions either as the sole toxic ingredient or in combination with such materials as pyrethrum, rotenone, organic thiocyanates, lead arsenate, copper sprays, sulfur, organic dyes, and the like.

A preferred embodiment of the invention includes the use of solutions of the di-(2-chloro-cyclohexyl)-sulfide in volatile organic solvent for the control of fabric destroying organisms such as clothes moth and carpet beetle. In such application, the toxicant appears to act both as a repellent and contact poison whereby the organism either does not attack the fabric or is killed without feeding. Deposits of the toxicant in and on wool, hair, and the like, are persistent in their action and withstand laundering without substantial loss in toxicity. Also, wool retains a considerable proportion of the di-(2-chloro-cyclohexyl)-sulfide deposited therein even after dry-cleaning. This phenomenon indicates the probability of chemical combination with the toxicant.

The following examples are illustrative with respect to the particular composition types and concentrations employed and the organisms controlled and are not to be construed as limiting the invention.

Example 1

A spray composition was prepared by dissolving 15 grams of di-(2-chloro-cyclohexyl)-sulfide in 1000 milliliters of a light petroleum fraction. The composition was then employed for the control of the confused flour beetle (*Tribolium confusum*). In this operation, 30 to 50 of the adult beetles are placed in a 9 centimeter diameter petri dish lined with filter paper, and sprayed with one milliliter of the spray solution. The composition was found to give a knockdown of 85 per cent in 15 minutes and a kill of 100 per cent in 72 hours. These figures represent the average of 7 determinations.

*Example 2*

2 parts by weight of di-(2-chloro-cyclohexyl)-sulfide was dispersed on 98 parts of a finely-divided talc to produce a dust mixture. This product was employed for the control of cockroaches and found to give a 100 per cent kill of insects contacted therewith in 18 hours.

*Example 3*

20 parts by weight of di-(2-chloro-cyclohexyl)-sulfide and 80 parts of diatomaceous earth were ground and mixed together to produce an insecticide concentrate. Sufficient of this mixture was dispersed in water containing 0.25 pound of sodium lauryl sulfate per 100 gallons to give a spray composition containing 1.0 pound of toxicant per 100 gallons. This product was applied for the control of greenhouse red spider adults and found to give 100 per cent control.

*Example 4*

5 parts of di-(2-chloro-cyclohexyl)-sulfide, 1 part of soya bean oil, and 94 parts of talc were mixed together to produce an agricultural dust mixture. When applied by conventional dusting procedures, the product gave a 75 per cent control of pea aphid and a 90 per cent control of potato leaf hopper.

*Example 5*

A spray concentrate was prepared by dissolving 4 parts by weight of di-(2-chloro-cyclohexyl)-sulfide in 96 parts of a dormant spray oil. This basic composition was dispersed in water at the rate of 3 gallons of concentrate per 100 gallons of ultimate spray. The emulsion so obtained was applied for the control of eggs of O. fasciatus and found to give a 76 per cent kill.

*Example 6*

Fabric treatments were carried out in which 2-inch squares of white wool serge were wet with varying amounts of di-(2-chloro-cyclohexyl)-sulfide dissolved in methyl ethyl ketone. After allowing the treated cloth to dry in air for approximately 24 hours, each sample was placed along with from 5 to 10 half-grown larvae of the black carpet beetle (*Attagenus piceus*) into a screened box. Weekly observations were made for the removal of dead larvae and cast skins from the test chambers, with new larvae being introduced from time to time to replace those dying during the observation period. In one such determination in which the cloth contained 8 per cent by weight of toxicant, there was no visible feeding over a period of 28 weeks, and a 100 per cent kill of the carpet beetle larvae was obtained.

In a further operation in which the cloth segments contained 2.8 per cent by weight of toxicant, a 100 per cent kill of 10 test larvae was obtained in 4 weeks. The frass or larva excrement recovered from the cloth and directly attributable to the activity of the larvae was only 0.7 milligram in weight. Untreated cloth squares similarly exposed to the attack of 10 black carpet beetle larvae produced 25.5 milligrams of frass over the same period.

To determine the effect of laundering upon the toxicant-impregnated samples, several sections of the treated cloth were washed in an all purpose household soap solution of 1.5 grams per 100 milliliters of water for 30 minutes at 70° F. The soap was then thoroughly rinsed from the cloth with warm water and the cloth dried. Untreated cloth was similarly washed and dried. Laundered cloth sections originally containing 2.8 per cent by weight of toxicant were placed in test chambers, each containing 10 larvae of the black carpet beetle. No visible feeding took place over a period of 4 weeks and the frass produced on each cloth sample averaged only 1.1 milligrams. Control determinations with the untreated but laundered wool segments showed a frass production of 36.1 milligrams per 2-inch square over the same period.

A similar operation was carried out in which the cloth originally treated with di-(2-chloro-cyclohexyl)-sulfide was washed with a dry-cleaning solvent (86 per cent carbon tetrachloride and 14 per cent ethylene dichloride) for 25 minutes. The cloth was then removed and dried. This operation was duplicated for cloth samples which had not received the preservation treatment. Cloth sections originally containing 4.2 per cent by weight of toxicant, after dry-cleaning, showed visible feeding to a slight degree in 4 weeks. The frass production on these samples amounted to 3.6 milligrams per 2-inch square. The control operations with untreated but cleaned wool fabric showed heavy visible feeding and a frass production of 36.1 milligrams per 2-inch square over the same period.

*Example 6*

In like manner, sections of the white wool serge were impregnated with di-(2-chloro-cyclohexyl)-sulfide and exposed to attack by larvae of the webbing clothes moth. In these operations, segments containing 4.2 per cent by weight of toxicant showed no visible feeding after 4 weeks' contact with 10 moth larvae. The mortality of larvae over this period was 100 per cent.

The preparation of the compound di-(2-chloro-cyclohexyl)-sulfide is readily accomplished by reacting together sulfur dichloride and cyclohexene. The temperature of reaction is not critical as long as the reaction mixture is liquid. Thus, the reaction may be carried out at any temperature from 0° C. to 80° C. or higher as desired.

In a representative operation, 164 grams (2 moles) of cyclohexene dissolved in 500 milliliters of carbon tetrachloride is placed in a suitable reactor equipped with a reflux condenser and agitator. 103 grams (1 mole) of sulfur dichloride is added portion-wise and with agitation to the cyclohexene solution at such a rate as to maintain the temperature of the reaction mixture at 70°–80° C. When all of the sulfur dichloride has been added, the mixture is warmed and stirred at 60° C. for an additional hour, and thereafter stored at 0° C. for 24 hours. 100–110 grams of crystalline di-(2-chloro-cyclohexyl)-sulfide settles out and is recovered by filtration. This product may be further purified, if desired, by crystallization from diethyl ether. Recrystallized di-(2-chloro-cyclohexyl)-sulfide, melting at 72°–73.5° C., is substantially insoluble in water, soluble in ethyl alcohol to the extent of 6.34 grams per 100 grams of solvent at 25° C., soluble in carbon tetrachloride to the extent of more than 31 grams per 100 grams of solvent at 15° C., and soluble in kerosene to the extent of 22.8 grams per 100 grams of solvent at 25° C.

I claim:

1. A moth-proofing composition including a solution of di-(2-chloro-cyclohexyl)-sulfide in a volatile organic solvent.

2. An insecticidal spray composition including di-(2-chloro-cyclohexyl)-sulfide as an active toxic ingredient dispersed in a liquid carrier.

3. An insecticidal dust including di-(2-chlorocyclohexyl)-sulfide as an active toxicant dispersed on a finely-divided solid carrier.

4. Di-(2-chloro-cyclohexyl)-sulfide, melting at 72°–73.5° C.

HAROLD W. MOLL.

REFERENCES CITED

The following references are of record in the file of this patent:

UNITED STATES PATENTS

| Number | Name | Date |
|---|---|---|
| 1,765,601 | McKee | June 24, 1930 |
| 2,249,312 | Kimball | July 15, 1941 |

FOREIGN PATENTS

| Number | Country | Date |
|---|---|---|
| 502,320 | Great Britain | Mar. 15, 1939 |

OTHER REFERENCES

Meyer, Chemical Abstracts, vol. 23, 1923, page 1524.

Meyer, Chemical Abstracts, vol. 30, 1936, page 4047.

Roark et al., "A List of Organic Sulphur Compounds," E-344, U. S. D. A., May, 1935, pages 14–22.